United States Patent Office 3,657,446
Patented Apr. 18, 1972

3,657,446
PROCESS FOR PREPARATION OF A PESTICIDE IN DRY FORM
Kenneth A. E. Blackmore, Bellingham, Wash., assignor to Georgia-Pacific Corporation, Portland, Oreg.
No Drawing. Filed Sept. 15, 1966, Ser. No. 579,487
Int. Cl. A01n 9/12, 9/20
U.S. Cl. 424—274
10 Claims

ABSTRACT OF THE DISCLOSURE

Preparation of a high-density, readily miscible dry pesticide by spray drying an emulsion obtained by intermixing a lignosulfonate aqueous solution with a solution of the pesticide in a water-immiscible solvent. The spray-dried product is ground and granulated by moistening the ground product with a lignosulfonate solvent in which the pesticide is insoluble and mixing the moistened product to agglomerate the product to form granules.

---

This invention pertains to a process for the preparation of a pesticide. More particularly, it pertains to an improvement for the preparation of a relatively dense, readily miscible dry pesticide.

A pesticide, to become widely accepted, must be available to the consumer in a form convenient to handle and apply. Even though a pesticide may be very selectively toxic to a wide variety of insects and pests and non-toxic to other animals and plant life, it may find limited utility if it cannot be easily handled or effectively applied by the normally used methods such as dusting or spraying.

Pesticides are commonly marketed in a dry form which can be used for dusting or upon addition to water will form dispersions or emulsions for spray application. To obtain an acceptable product, it is necessary to have the pesticide in fine particle size, generally less than 5 microns. The small particle size is necessary to obtain a relatively stable emulsion or dispersion to permit the spraying of the dispersion without the pesticide settling out. Unless stable emulsions or dispersions are obtained, uniform application of the pesticide cannot be made, even though the settling may not be sufficient to result in plugging of the spray nozzles. It is also essential that the pesticide be readily wettable or miscible with liquids. Another important factor for the acceptability of a dry pesticide is to have the product relatively dust-free. Often the pesticides are irritating chemicals and are very undesirable and hazardous to handle if dusty. In addition, it is also desirable to have a product that is relatively dense which not only minimizes the packaging problems but is more desirable for shipping.

In recent years, a number of organic pesticides have become available which have very desirable toxic properties but have other properties making the pesticide difficult to use. Many of the organic pesticides are insoluble in water and undergo crystallization in a dry state so that they must be formulated by special means into particular compositions.

One method which has been suggested for the preparation of these pesticides is to dissolve the pesticide in a solvent and then intermix this solution with an aqueous lignosulfonate solution to obtain an emulsion from which the solvent and water are evaporated leaving a dry powder containing a mixture of fine particles of the pesticide intermixed intimately with the lignosulfonate. Such a process is described in British Pat. No. 573,832, which issued Dec. 7, 1945. Similar processes with different modifications are described in other patents and publications, for example, Netherlands Pat. No. 6400575. These processes are especially desirable for many new pesticides, such as naphthyl-alkyl carbamates and halogenated aromatics which have limited solubility in solvents which are readily available and not toxic to desirable plants. However, the product obtained by these processes, especially where the emulsion is spray dried, generally has a very low bulk density in the range of about 5 to 10 pounds per cubic foot or less, and is very dusty. The product, being light, is readily spread by any stray breeze or disturbance. While granulation of the product by moistening the product in a rotating drum or on a rotating disc will increase the density of the material somewhat, the product still is very light and bulky and is not as readily wettable or miscible with water as would be desirable. A further disadvantage is that in the granulation of the product, often large amounts of water must be added in order to effect the granulation. Since the product must be dried after granulation to remove a substantial portion of the added moisture, the minimum amount of water is desirable. Also the use of a larger amount of moisture decreases the capacity of the granulation equipment. When a relatively small amount of water is used, granulation is not completely effected and the product contains a large amount of fines.

It is therefore an object of this invention to provide a dry pesticide composition which is relatively dense and readily wettable and miscible with water. A further object is to provide an improvement in the process for preparation of a pesticide wherein the pesticide in a solution is emulsified with an aqueous lignosulfonate solution and spray dried. A still further object is to provide a process requiring only a relatively small amount of moisture or binder for the granulation of the pesticide.

The above and other objects are attained according to the invention by ball milling the product obtained upon spray drying of the emulsion of the pesticide in the lignosulfonate prior to granulation. Upon grinding the spray dried powder prior to granulation, a product is obtained which has a density increased several fold, improving the packaging and handling of the product as well as its dust-free properties. The water or solvent requirement for granulation is decreased, and a readily wettable and water miscible product is obtained.

In the preparation of the pesticide emulsion, the pesticide may be dissolved in a solvent at any concentration and then intermixed with an aqueous lignosulfonate solution which may have a concentration of from 5 to 75 weight percent of solids. The ratio of the pesticide solution and lignosulfonate solution used is such that upon spray drying a mixture is obtained which contains generally from about 20% to 80% of lignosulfonate solids, preferably 30% to 60%. Any pesticide solvent which is immiscible with water in the concentrations used to form emulsions may be used. The solvent may have a boiling point higher or lower than water. Halogenated hydrocarbons such as chloroform, methylene chloride and carbon tetrachloride may be conveniently used for 1-naphthyl N-alkyl carbamate type pesticides such as 1-naphthyl N-methyl carbamate sold under the trademark of Sevin, and for halogenated aromatic-type pesticides, such as N-trichloromethylthiophthalimide and 4-chlorophenyl 2,4,5-trichlorophenyl sulfone, and others such as 2-sec-butyl-4,6-dinitrophenyl 3-methyl-2-butenoate, and N-trichloromethylmercapto-4-cyclohexene - 1,2 - dicarboximide. Illustrative examples of other solvents in addition to halogenated hydrocarbons are benzene, toluene, heptane, and other hydrocarbons. In many of the solvents, the pesticides may have only limited solubility so that the concentration of pesticide in solution may be limited by its solubility. Generally, it is preferred to have a solvent such that the pesticide may be dissolved in a concentration from 5% to 20% and the solution used for the formation of emulsions.

While the aqueous lignosulfonate solution with which the pesticide solutions are emulsified may be widely varied, it is generally preferred to employ a lignosulfonate solution containing from 15% to 35% of solids. Lignosulfonate solution containing 55% and higher may be used but generally the solutions of this concentration are relatively viscous and more difficult to handle in spray drying. Also, low concentration solutions of lignosulfonate and the pesticide are desirable, since they are more easily emulsified. However, more liquids have to be removed upon spray drying which decreased the capacity of the spray dryer. Thus, a lignosulfonate solution containing less than 10% is seldom employed.

The lignosulfonate used for the emulsification may be obtained by sulfonation, by the various known methods, of lignin obtained from any source. Lignin is a polymeric substance of substituted aromatic found in plant and vegetable tissue associated with cellulose and other plant constituents. Thus, vegetable and plant tissue are lignin-containing materials which are the principal sources of lignin.

One of the main sources for lignosulfonate is the residual pulping liquors from the paper and pulp industry where lignocellulosic materials such as wood, straw, corn stalks, bagasse and the like are processed to separate the cellulose or pulp from the lignin. In the sulfite pulping process, the lignocellulosic material is digested with a bisulfite or sulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulose materials from the other processes and also from the sulfite process may be treated by various known methods to sulfonate the product to the different degrees desired. For example, the residual liquor obtained in an alkaline pulping process such as kraft, soda or other alkaline processes may be sulfonated by reacting the product with a bisulfite or sulfite to obtain a sulfonated residual pulping liquor. Likewise, lignins known as "hydrolysis lignin" obtained from the hydrolysis of lignocellulose and "hydrotropic lignins" derived from the hydrotropic pulping processes may be sulfonated and used.

The lignosulfonate product obtained from the sulfite pulping process or by the sulfonation of other residual pulping liquors or lignin-containing material may contain many other constituents besides the sulfonated lignin. While these other materials may be removed, it is not necessary to do so. The lignosulfonates in the pulping liquors may be fractionated to obtain lignosulfonates of a particular molecular weight or the pulping liquor subjected to alkaline, heat or an acid pretreatment. However, generally the residual pulping liquor is used without any further processing or treatment other than the removal of the sulfurous acid which may be present, for example, in the spent sulfite liquor.

The sulfonated lignins obtained upon the sulfonation of lignin may be salts of certain metals, such as magnesium, calcium, ammonium, sodium and others. The lignosulfonate thus obtained may be used as such or converted to salts of other metals.

In spray drying the emulsions obtained, the well known spray drying processes and equipment may be employed. The product obtained upon spray drying is then subjected to size reduction by ball milling. Generally, the product is ground to obtain at least an average particle size of about 1 to 10% of the original average size. Various ball-milling methods and equipment may be used to effect the size reduction such as a simple ball or a roller type mill. The material is relatively soft and easy to grind. However, the grinding method employed has to be such that the heat generated by the grinding is dissipated and will not melt the product.

In the granulation or in nodulizing the ground product, the various types of known equipment may be employed. Equipment employing rotational means for granulation such as a rotating drum or disc are generally used. Usually, water is used to moisten the product but other lignosulfonate solvents in which the pesticide is not soluble may likewise be used.

The examples below further illustrate the invention.

EXAMPLE I

To illustrate the improvement obtained in granulating a spray dried emulsified insecticide, a run was made where a 1-napthyl N-Methyl carbamate type of insecticide made by emulsifying a solution of the insecticide in a spent sulfite liquor was granulated after spray drying and also after the product was ground prior to granulation.

The spray dried product containing about equal amounts of the insecticide and spent sulfite liquor had a bulk density of around 7 lbs./cu. ft. It was dusty and had a wetting time of about two hours according to the standard wetting test which is the time required to completely wet a 5 g. sample of the product when it is added without mixing to 100 ml. of water in a 250 ml. beaker.

A 100 g. sample of the spray dried insecticide was granulated in a baffled rotating drum. Eight grams of water as a fine mist was added while the drum was rotated. After granulation, the product was removed and dried at room temperature to remove the excess moisture.

The granulated product was then screened to remove particles smaller than 100 mesh. Approximately 50% of the granulated product was under size and passed through the screen. The granulated particles above 100 mesh in size had a bulk density of 16 lbs./cu. ft. and had a wetting time of about one hour. The wetting time was decreased to 15 minutes by the removal of the particles which passed through a 50 mesh screen.

A portion of the spray dried insecticide described above was ground prior to granulation. For the grinding operation a 1000 g. sample of the insecticide was placed in a 12-inch diameter pebble mill, together with 5.4 kilograms of ¾" diameter pebbles. The mill was rotated at 37 r.p.m. for 50 minutes in which time the average particle size of the product was reduced to about 2% of tis original size. The product after ball milling had a density of 21 lbs./cu. ft. The ball milled insecticide in an amount of 200 g. was granulated in the rotating drum granulator by addition of a total of 12.5 g. of water as a fine mist. The granulated product was dried at room temperature and upon screening only about 25% of the total charge was under 100 mesh size. The product after screening had a wetting time of less than two minutes and a density of 24 lbs./cu. ft.

Similar results were obtained with a fungicide, N-trichloromethylmercapto-4-cyclohexene-1, 2-dicarboximide. The spray dried product had a density of 7 lbs./cu. ft. and after grinding and granulation, the bulk density was 27.2 lbs./cu. ft.

Also, similar results can be obtained with 4-chlorophenyl 2,4,5-trichlorophenyl sulfone and N-trichloromethylthiophthalimide.

EXAMPLE II

To illustrate the improvement obtained in the wetting time by grinding a product prior to granulation, a run was made where a spray dried composition of a herbicide (3',4'-dichlorocyclopropanecarboxanilide) manufactured by the Spencer Chemical Co. and sold under the trademark of Cypromid was granulated with and without prior grinding. The herbicide composition was made by emulsifying a solution of the herbicide in a spent sulfite liquor and spray drying the emulsion. A portion of the spray dried herbicide was granulated by adding about 8% of water as a fine mist while being rotated in a baffled drum. The product was then dried at room temperature to remove the excess moisture and screened to remove all particles smaller than 100 mesh. A second portion of the spray dried herbicide was placed in a pebble mill and ground in the pebble mill for ½ hour at a rotation of about 37 r.p.m. The ground product was then granulated by adding about 8% of water as a fine mist, in a rotating baffled drum and the product screened to remove particles smaller than 100 mesh. The results obtained are shown in the table below.

|  | Bulk density, lbs. cu. ft. | Wetting time |
|---|---|---|
| Untreated herbicide | 7 | 50% of sample in 10 minute |
| Granulated herbicide | 13.4 | 90% of sample in 30 seconds |
| Preground and granulated herbicide | 22.5 | 100% of sample in 12 seconds |

What is claimed is:

1. A process for the preparation of a pesticide composition in dry form, which comprises dissolving the pesticide in a water-immiscible solvent to obtain a solution containing in the range of from 5 to 50 percent by weight of the pesticide, intermixing the pesticide solution with an aqueous lignosulfonate solution containing from 5 to 75 weight percent of solids to thereby obtain an emulsion, spray drying the emulsion to obtain the pesticide as a dry product intimately intermixed with a lignosulfonate, said pesticide solution and lignosulfonate solution being intermixed in proporton such that the spray dried product contains from 20 to 80 weight percent of the lignosulfonate solids, ball milling the dry powder obtained upon spray drying to obtain an average size reduction of the particles to at least 10% of the original size, moistening the ground product with water, granulating the moistened product, and drying the resulting granulated product.

2. A process according to claim 1 wherein a pesticide is 1-naphthyl N-methylcarbamate.

3. A process according to claim 1 wherein a pesticide is N-trichloromethylmercapto-4-cyclohexene-1,2 - dicarboximide.

4. A process for the preparation of a pesticide composition in dry form, which comprises dissolving the pesticide in a water-immiscible solvent to obtain a solution containing from 5 to 50 weight percent of the pesticide, intermixing the pesticide solution with an aqueous lignosulfonate solution containing from 5 to 55 weight percent of solids to thereby obtain an emulsion, spray drying the emulsion to obtain the pesticide as a dry product intimately intermixed with the lignosulfonate, said pesticide solution and lignosulfonate solution being intermixed in proportion such that the spray dried product contains from 20 to 80 weight percent of the lignosulfonate solids, ball milling the dry product obtained upon spray drying to obtain a size reduction of the particles of from 1 to 10% of the original size, moistening the dry product with water, granulating the moistened product, and drying the granulated product.

5. A process for the preparation of a pesticide composition in dry form, which comprises dissolving the pesticide in a water-immiscible solvent to obtain a solution containing from 5 to 20 weight percent of the pesticide, intermixing the pesticide solution with an aqueous lignosulfonate solution containing from 15 to 30 weight percent of solids to thereby obtain an emulsion, spray drying the emulsion to obtain the pesticide in a dry form intimately intermixed with a lignosulfonate, said pesticide solution and lignosulfonate being intermixed in proportion such that the spray dried product contains from 30 to 60 weight percent of the lignosulfonate solids, ball milling the dry powder obtained upon spray drying to obtain an average size reduction of the particles of from 1 to 10% of the original size, moistening the ground product with water, rotating the moistened product to thereby granulate the product and drying the granulated product.

6. A process according to claim 5 wherein the lignosulfonate is a spent sulfite liquor.

7. A process according to claim 6 wherein the pesticide is 1-naphthyl N-methylcarbamate.

8. A process according to claim 6 wherein the pesticide is N-trichloromethylmercapto-4-cyclohexene-1,2 - dicarboximide.

9. A process according to claim 6 wherein the pesticide is 4-chlorophenyl 2,4,5-trichlorophenyl sulfone.

10. A process according to claim 6 wherein the pesticide is N-trichloromethylthiophthalimide.

References Cited

UNITED STATES PATENTS

| 2,858,250 | 10/1958 | Geary | 167—42 |
| 2,871,155 | 1/1959 | Klomparens et al. | 167—42 |
| 3,262,788 | 7/1966 | Swanson et al. | 23—313 X |
| 2,293,126 | 12/1966 | Person et al. | 167—42 |
| 3,201,466 | 8/1965 | Dubrovin | 71—118 X |

FOREIGN PATENTS

| 573,832 | 12/1945 | Great Britain. |

OTHER REFERENCES

Pesticidal Index, Frear, 1961, College Science Pub., State College, Pa., pp. 139, 175, 181.

ALBERT T. MEYERS, Primary Examiner

L. SCHENKMAN, Assistant Examiner

U.S. Cl. X.R.

71—118; 424—300, 337